US006315508B1

(12) United States Patent
Nadon

(10) Patent No.: US 6,315,508 B1
(45) Date of Patent: Nov. 13, 2001

(54) ROLL-ON ROLL-OFF CONTAINER HOOKS

(76) Inventor: Gilles Nadon, 634 St. Louis Road, Beauharnois, Quebec (CA), J6N 2K6

( * ) Notice: Subject to any disclaimer, the term of this patent is extended or adjusted under 35 U.S.C. 154(b) by 0 days.

(21) Appl. No.: 09/110,382

(22) Filed: Jul. 1, 1998

(51) Int. Cl.$^7$ .................................................. B60P 7/08
(52) U.S. Cl. ................................................ 410/80; 410/77
(58) Field of Search ........................ 410/77–80; 296/35.3; 414/498; 280/DIG. 8; 248/500, 503, 681

(56) References Cited

U.S. PATENT DOCUMENTS

| | | | |
|---|---|---|---|
| 1,303,854 | * | 5/1919 | Clark .................................. 410/80 X |
| 2,351,314 | * | 6/1944 | Ario .................................. 410/80 X |
| 4,089,539 | * | 5/1978 | Berger .................................. 410/80 |
| 4,236,853 | * | 12/1980 | Niggemeier et al. .................. 410/77 |
| 5,362,184 | * | 11/1994 | Hull et al. .......................... 410/77 X |
| 5,829,946 | * | 11/1998 | McNeilus et al. .................. 410/80 X |

FOREIGN PATENT DOCUMENTS

4103255 A * 8/1992 (DE) ...................................... 410/80

* cited by examiner

*Primary Examiner*—Stephen T. Gordon
(74) *Attorney, Agent, or Firm*—Eric Fincham

(57) ABSTRACT

A locking apparatus for retaining a load on a vehicle wherein a locking member which has a load engaging element is moveable between first and second positions, the locking member being urged to the first lock position by a biasing member, and a drive member to move the locking member from the first position to the second position, there being provided a guide member which has a arcuate surface such that the locking member is moved to a non-load engaging position as the locking member moves along the guide member.

4 Claims, 7 Drawing Sheets

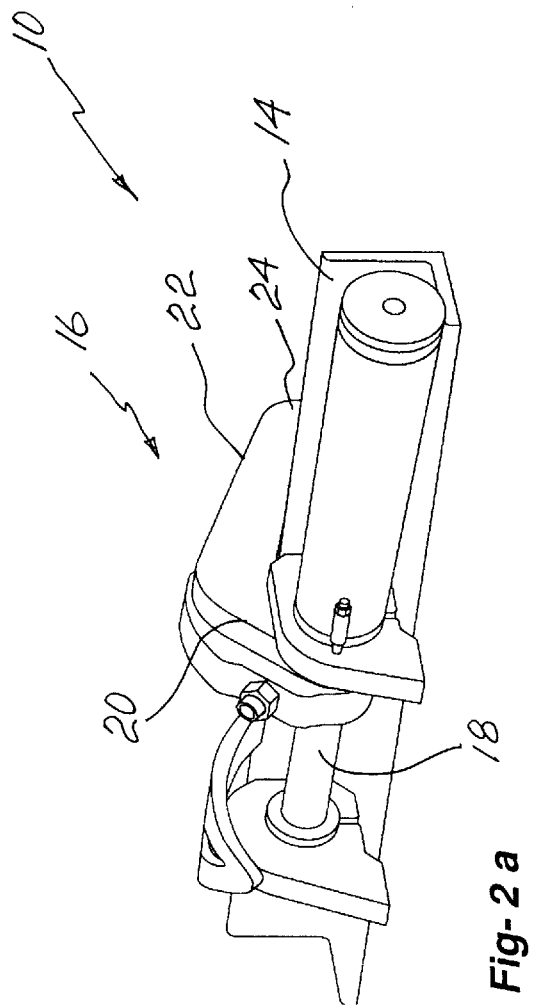
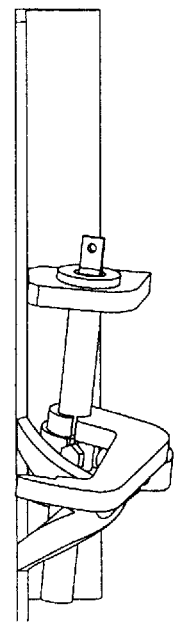
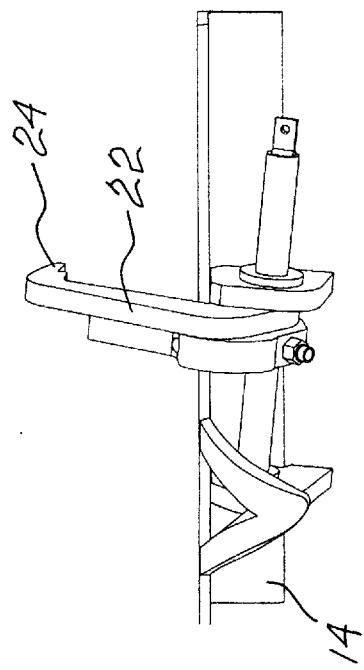
Fig-2a
Fig-2b
Fig-2c

ROLL-ON ROLL-OFF CONTAINER HOOKS

FIELD OF THE INVENTION

The present invention relates to a locking apparatus and more particularly, relates to a locking apparatus suitable for retaining of a container on a vehicle.

BACKGROUND OF THE INVENTION

In the transportation industry, containers are often rolled on and off of trucks. It is necessary to provide a secure means of retaining the container on the truck.

SUMMARY OF THE INVENTION

It is an object of the present invention to provide a locking apparatus which may be used to secure containers to a truck.

According to one aspect of the present invention, there is provided a locking apparatus for retaining a load on a vehicle, the locking apparatus comprising a locking member having a load engaging element moveable along a path from a first position to a second position, biasing means biasing the member to the first position wherein the load engaging element engages a load to be retained, drive means to move the locking member from the first position to the second position against the biasing means, guide means mounted that when the guide means moves the locking member from the first position to the second position, the load engaging element moves in an arcuate movement to a non-load engaging position.

BRIEF DESCRIPTION OF THE DRAWINGS

Having thus generally described the invention, reference will be made to the accompanying drawings illustrating an embodiment thereof, in which:

FIG. 2a is a perspective view of the locking apparatus in a load retaining position;

FIG. 2b is a side elevational view thereof;

FIG. 2c is a top plan view thereof;

DESCRIPTION OF THE PREFERRED EMBODIMENTS

Figure 1:
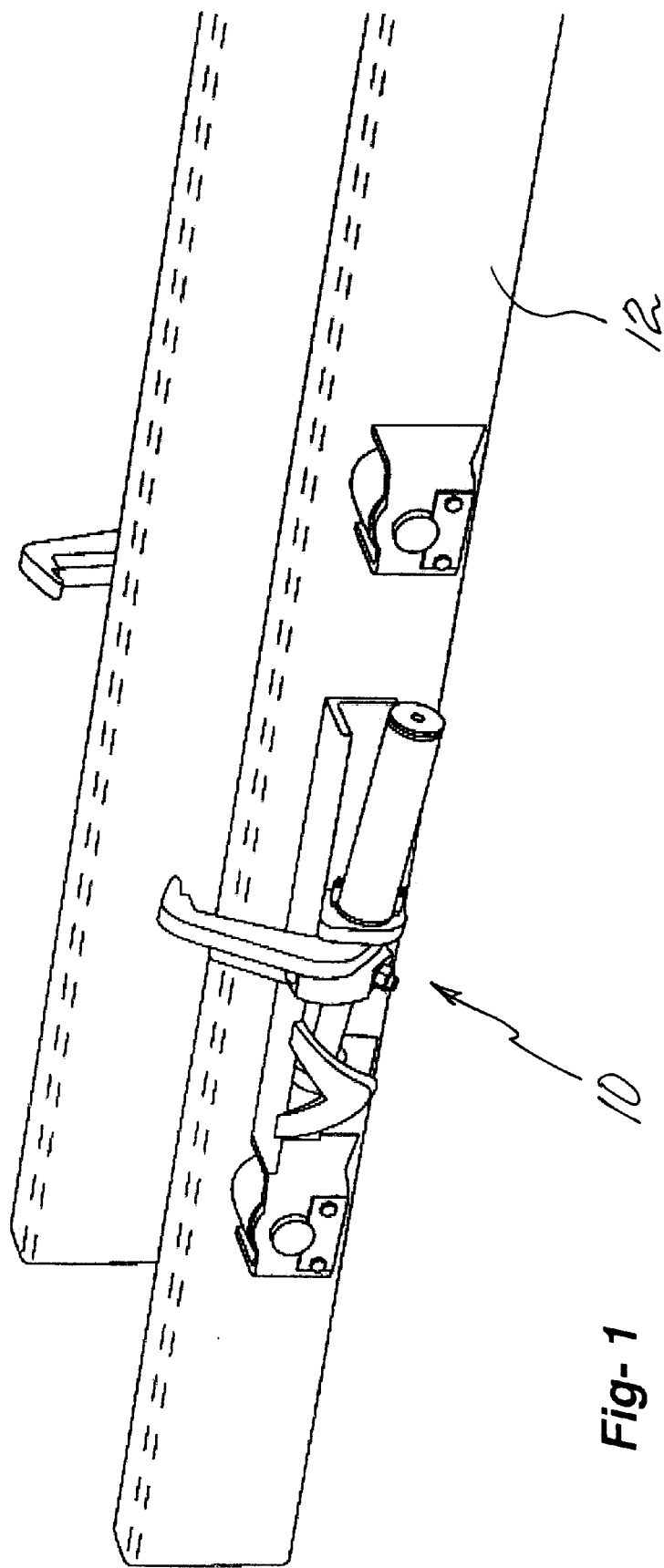
FIG. 1 is a perspective view of the locking apparatus of the present invention mounted on a rail designed to receive an article to be retained.
Figure 3:
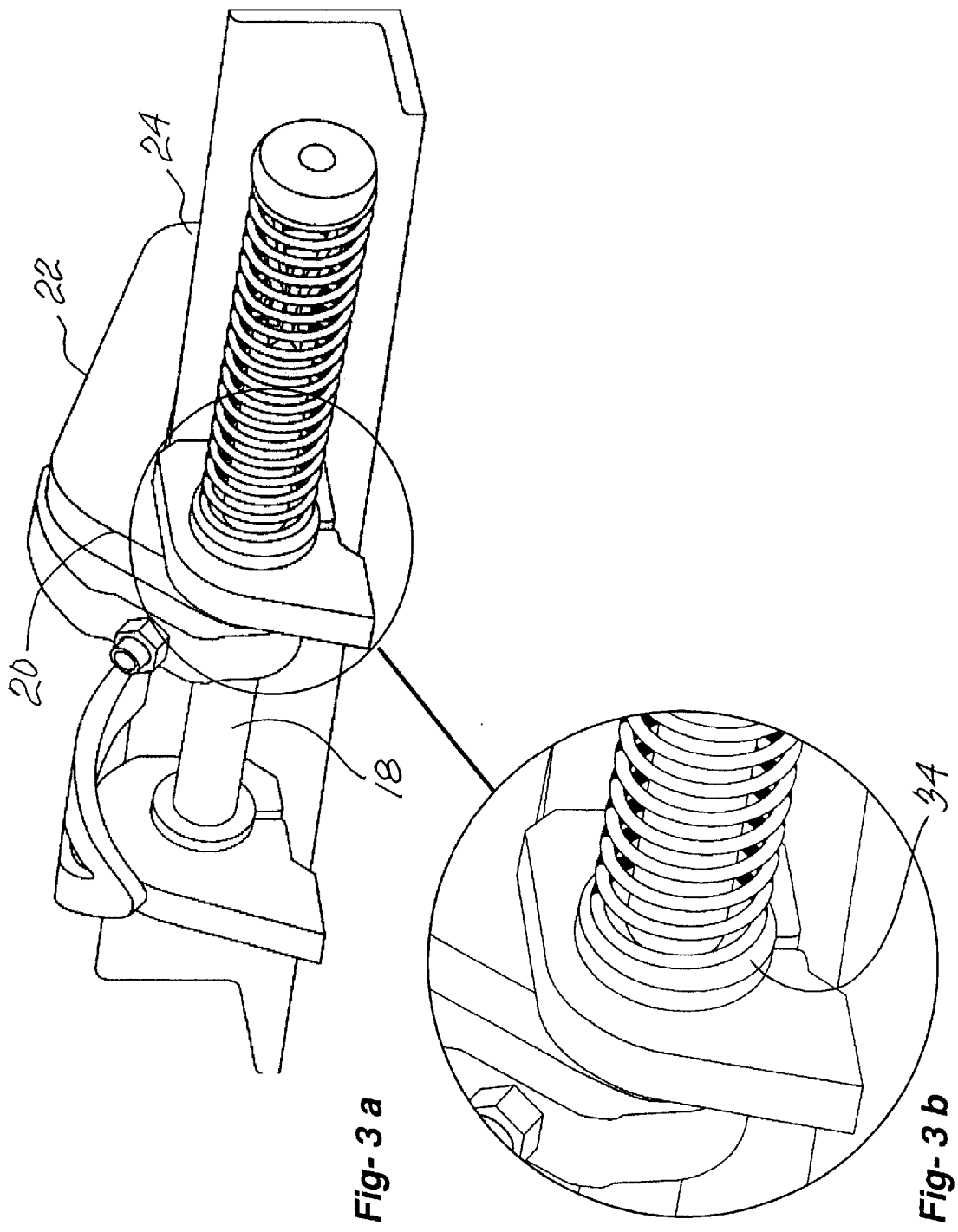
FIG. 3a is a perspective view similar to FIG. 2a with the spring biasing member being shown.
FIG. 3b is an expanded view showing one end of the spring.
Figure 4:
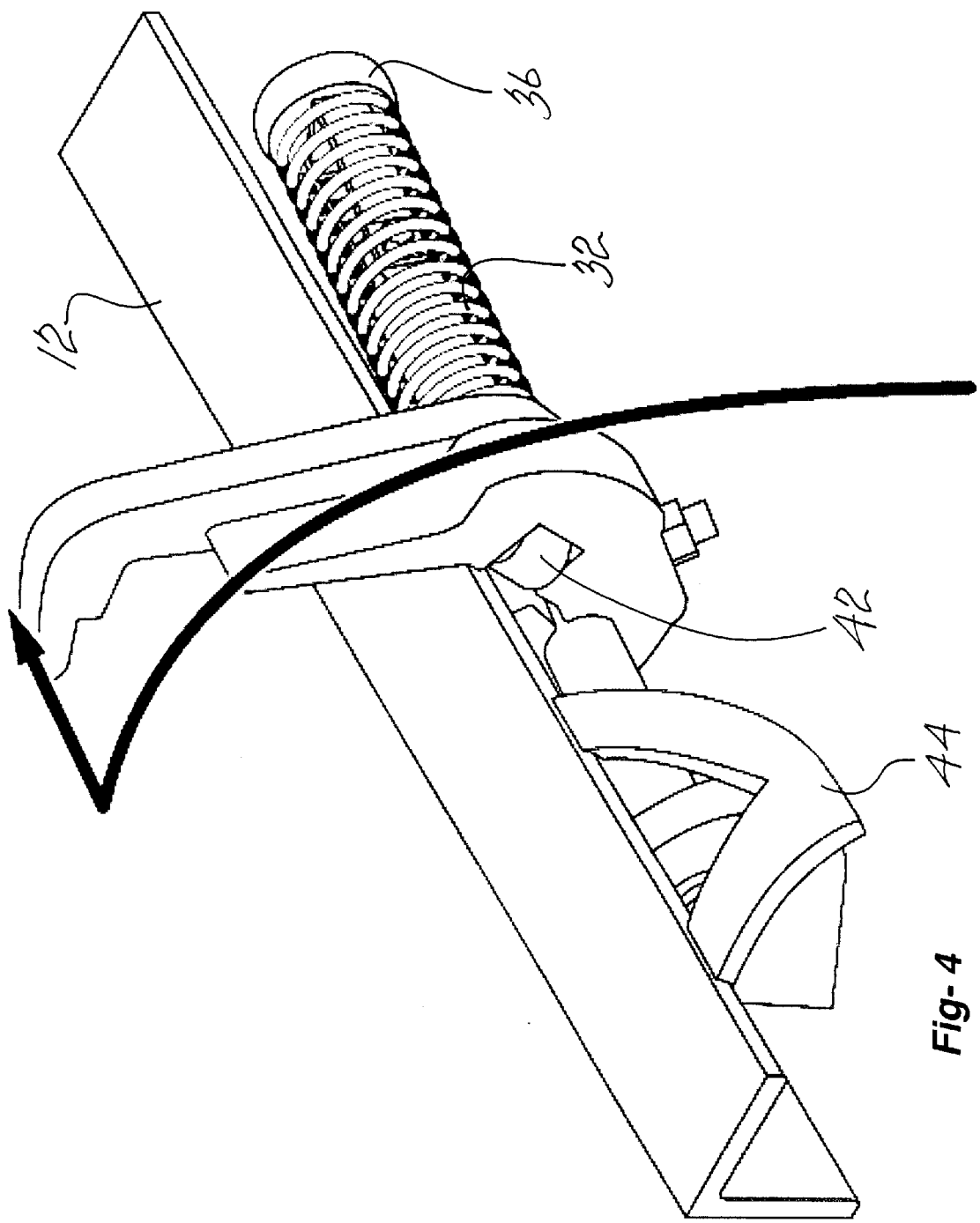
FIG. 4 is a perspective view illustrating movement of the locking member.

Referring to the drawings in greater detail and by reference characters thereto, there is illustrated a locking apparatus which is generally designated by reference numeral 10.

Locking apparatus 10 is shown mounted on an angle iron 14 while reference numeral 12 designates a portion of a truck mast.

A locking member generally designated by reference numeral 16 is mounted on shaft 18. Locking member 16 includes a body portion 20 from which extends outwardly arm 22. At the distal end of arm 22 there is provided a hook 24 which functions as a load engaging element.

The locking apparatus 10 also includes a pneumatic cylinder generally designated by reference numeral 28. Pneumatic cylinder 28 includes an outer housing 30 surrounding a coil spring member 32. Coil spring 32 is mounted at a first end as indicated by reference numeral 34 to locking member 16. At the other end, as designated by reference numeral 36, spring 32 is connected to portion 36 of pneumatic cylinder 28. An air supply hose 40 is provided for pneumatic cylinder 28.

Body portion 20 of locking member 16 includes a roller 42, the arrangement being such that roller 42 moves along an edge of angle iron 14 to which the locking apparatus 10 is mounted. It will be noted that, as may be best seen in FIGS. 2B and 2C, that locking apparatus 10 is mounted to have a longitudinal center line which is offset with respect to the longitudinal axis of angle iron 14.

Figure 5:
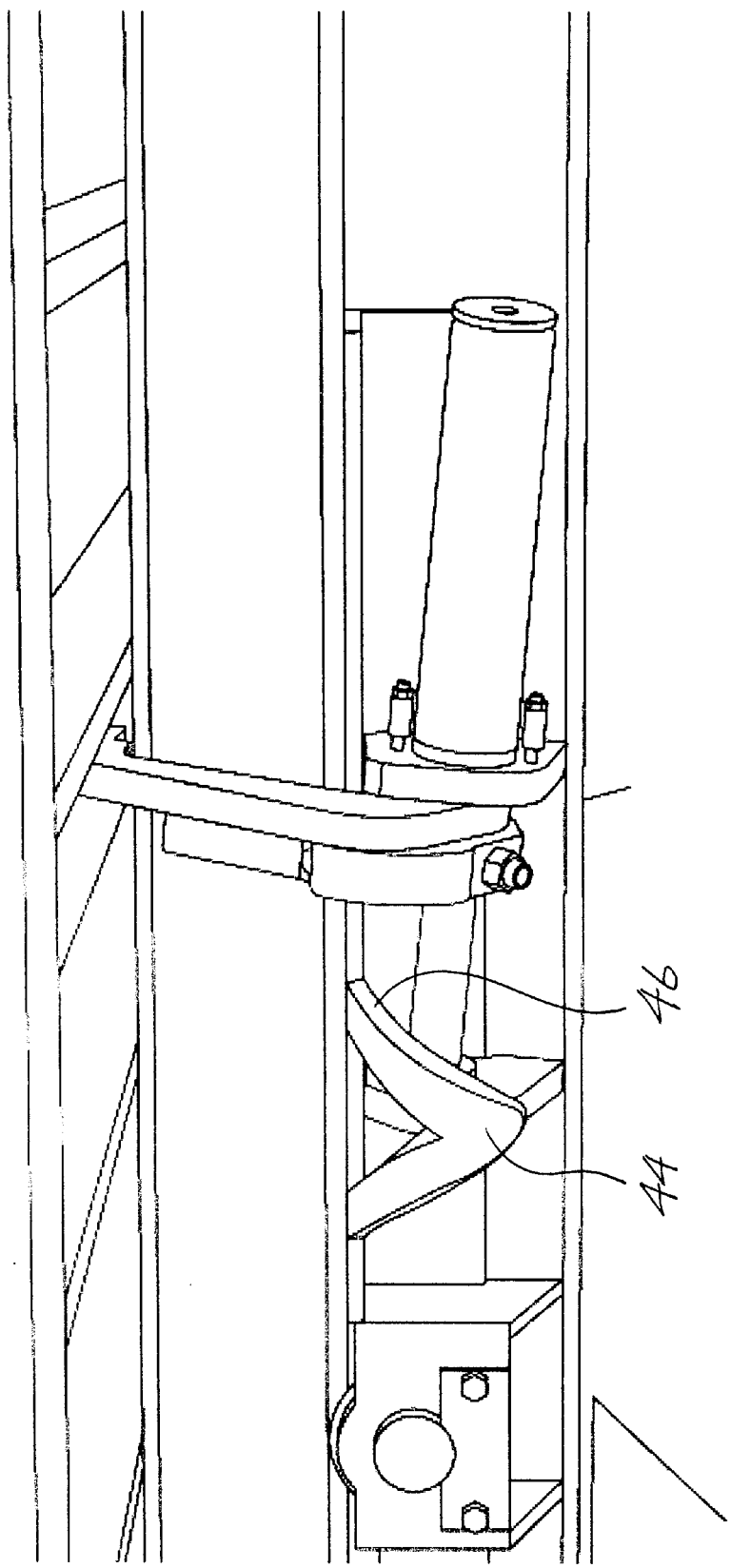
FIG. 5 is a side elevational view of the locking member in a locking position.
Figure 6:
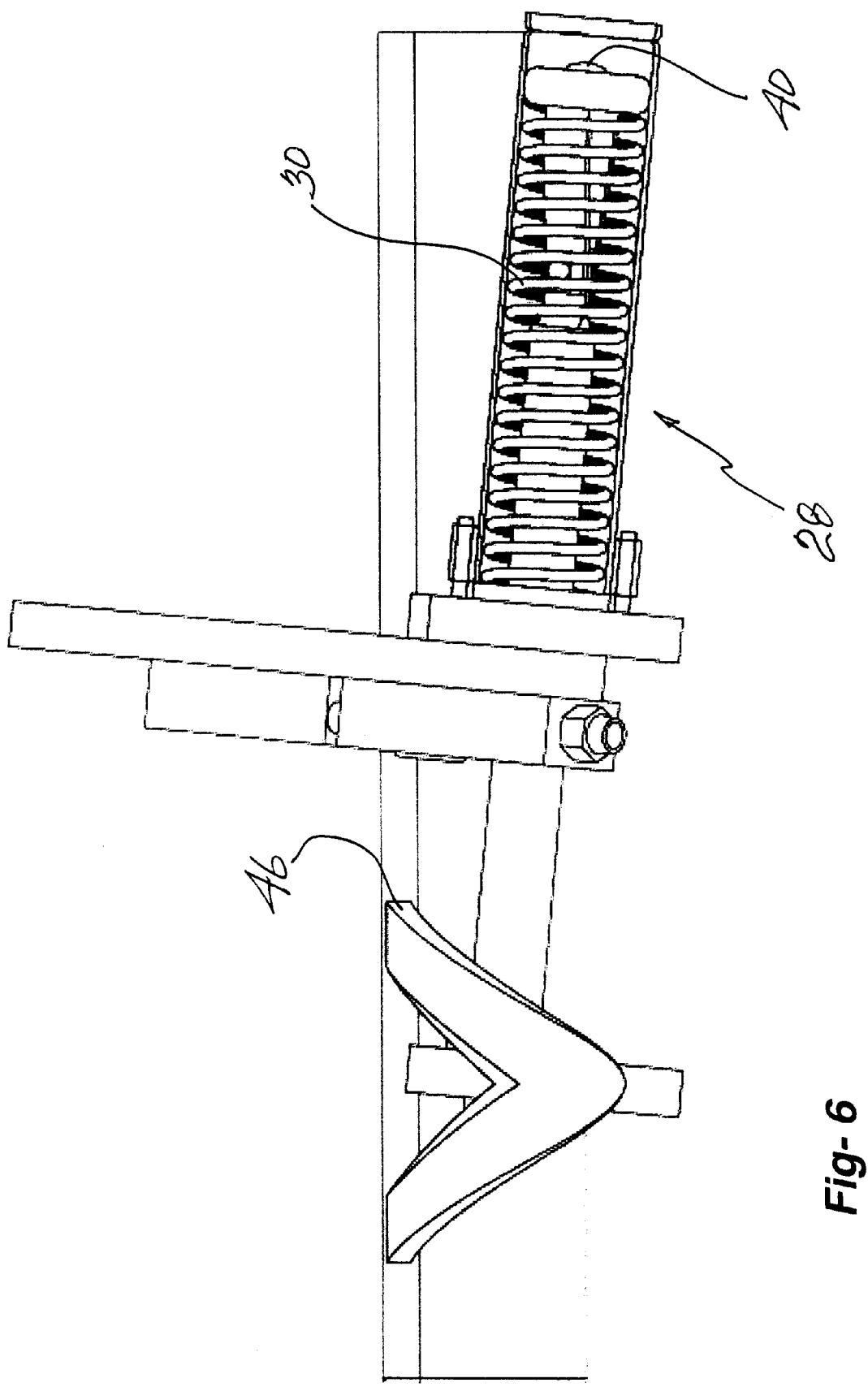
FIG. 6 is a side elevational view thereof.
Figure 7:
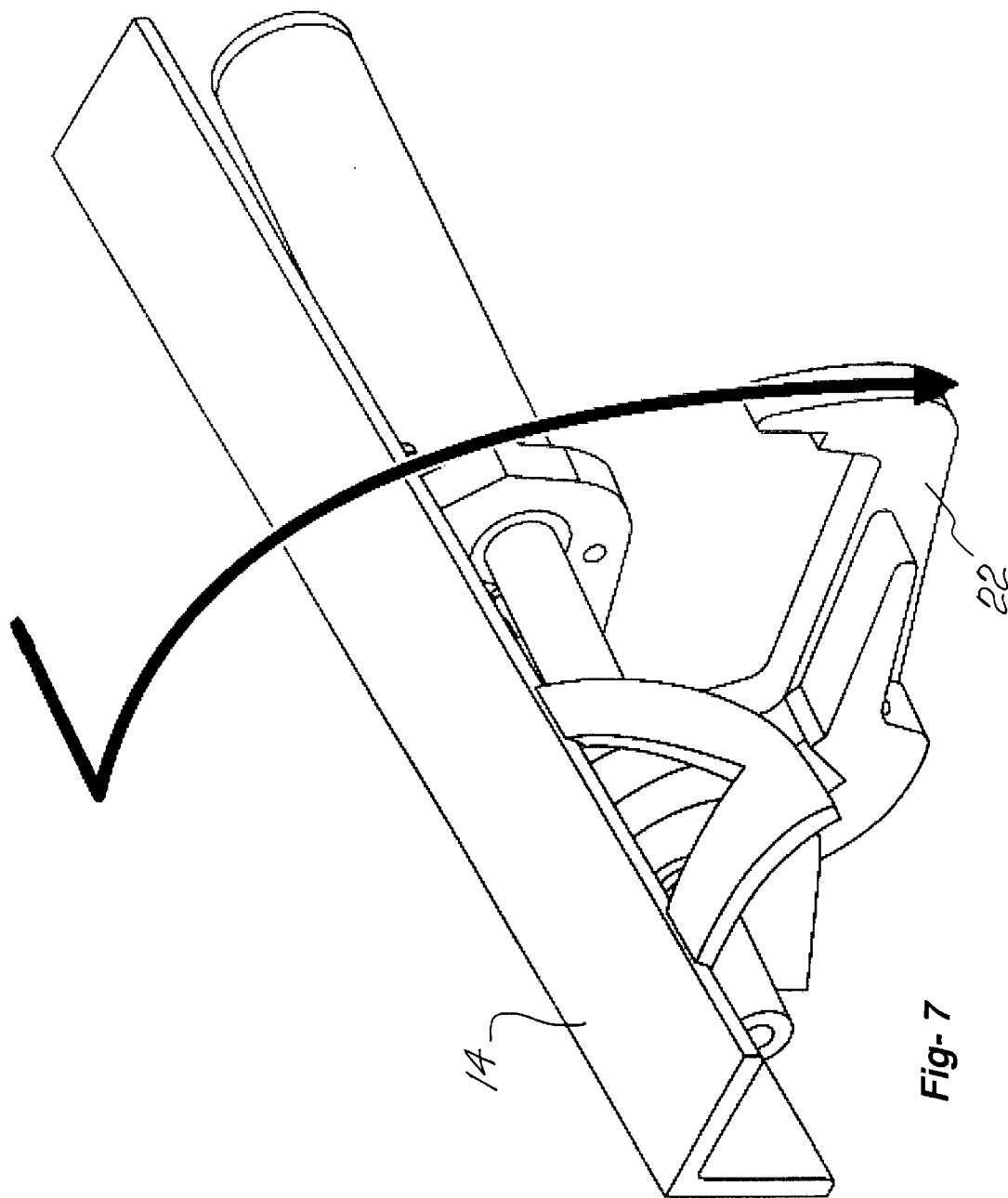
FIG. 7 is a perspective view similar to FIG. 4 illustrating the unlocking motion of the load retaining portion.

A guide member 44 is mounted on angle iron 14. An aperture receives and guides shaft 18. Guide member 44 includes an arcuate surface generally designated by reference numeral 46 (best seen in FIG. 5) such that as locking member 16 moves, roller 42 will contact surface 46. This will then cause body portion 42 to move therealong resulting in arm 22 and hook 24 moving upwardly and outwardly. In operation, as long as air pressure is applied to air supply hose 40 and pneumatic cylinder 28, locking member 16 is retained in the position shown in FIG. 7 wherein arm 22 and hook 24 stand outwardly from angle iron 14 and rail 12. However, upon the release of air pressure, body portion 20 and shaft 18 will move to the opposite position due to the biasing force of biasing means which comprises spring 32. As may be seen, due to the offset nature of locking apparatus 10, the load engaging element comprising hook 24 will move to exert a retaining force on a container rail.

It will be understood that the above described embodiment if for purposes of illustration only and that changes or modifications may be made thereto without departing from the spirit and scope of the invention.

I claim:

1. A locking apparatus for retaining a load on a vehicle, said locking apparatus comprising:

a locking member having a load engaging element moveable along a path from a first position to a second position;

biasing means biasing said member to said first position wherein said load engaging element engages a load to be retained;

drive means to move said locking member from said first position to said second position against said biasing means;

guide means mounted that when said guide means moves said locking member from said first position to said second position, said load engaging element moves in an arcuate movement to a non-load engaging position.

2. The locking apparatus of claim 1 wherein said biasing means comprises a spring member biasing said member to said first position.

3. The locking apparatus of claim 1 wherein said drive means comprises a pneumatically operated cylinder.

4. The locking apparatus of claim 1 wherein said locking member further includes a roller, said guide means being located such that said roller will engage said guide means to thereby cause said roller and locking member to move outwardly.

* * * * *